(12) United States Patent
Hovda et al.

(10) Patent No.: US 6,345,585 B1
(45) Date of Patent: Feb. 12, 2002

(54) PERSONAL WATERCRAFT WITH CHILD'S GRAB HANDLE

(75) Inventors: Alan T. Hovda, Spencer; John E. Thompson; Benoit Renaud, both of Spirit Lake, all of IA (US); Todd D. Dannenberg, Rogers, MN (US)

(73) Assignee: Polaris Industries Inc., Minneapolis, MN (US)

( * ) Notice: Subject to any disclaimer, the term of this patent is extended or adjusted under 35 U.S.C. 154(b) by 0 days.

(21) Appl. No.: 09/374,739

(22) Filed: Aug. 13, 1999

(51) Int. Cl.[7] ........................ B63B 17/00; B62K 21/12
(52) U.S. Cl. .................. 114/362; 114/343; 74/551.8
(58) Field of Search .................. 114/363, 55.5, 114/55.52, 343, 362; 74/551.8, 551.9

(56) References Cited

U.S. PATENT DOCUMENTS

| | | |
|---|---|---|
| 717,662 A | 1/1903 | Ellison |
| 1,448,921 A | 3/1923 | Ershkowitz |
| 2,491,609 A | 12/1949 | George .................... 74/552 |
| 3,695,210 A * | 10/1972 | Stein ...................... 441/69 |
| D263,293 S | 3/1982 | Janson ................... D12/178 |
| 4,688,508 A * | 8/1987 | Nishida ................... 114/362 |
| 4,870,843 A | 10/1989 | Lundberg ................. 70/233 |
| 5,037,687 A * | 8/1991 | Kargarzadeh et al. ...... 428/71 |
| 5,064,157 A | 11/1991 | O'Neal .................. 248/230.1 |
| 5,239,884 A | 8/1993 | Norsen ................... 74/551.8 |
| 5,315,895 A | 5/1994 | Kattus et al. ............ 74/551.8 |
| D349,879 S * | 8/1994 | Jaramillo, Sr. ............ D12/317 |
| D359,720 S * | 6/1995 | Jaramillo, Sr. ............ D12/317 |
| 5,490,474 A * | 2/1996 | Ikeda ...................... 114/343 |
| 5,503,419 A | 4/1996 | Gardner ................... 280/231 |
| 5,868,455 A * | 2/1999 | Springer et al. .......... 296/146.1 |
| 5,915,329 A * | 6/1999 | Watkins et al. ............ 114/363 |
| 6,010,140 A * | 1/2000 | Guynn ..................... 280/291 |

* cited by examiner

Primary Examiner—S. Joseph Morano
Assistant Examiner—Andrew D. Wright
(74) Attorney, Agent, or Firm—Fredrikson & Byron, P.A.

(57) ABSTRACT

A jet-propelled personal watercraft having a grab handle for a child riding in front of the operator of the watercraft. The watercraft includes a hull defining an engine compartment sized to contain an internal combustion engine for powering the watercraft, a deck portion providing a passenger area containing controls operable by an operator in the passenger area, and a longitudinally extending seat adapted to accommodate at least two riders seated in straddle fashion. A jet propulsion unit is powered by the engine, the jet propulsion unit including a steerable water discharge nozzle. The controls include a set of handlebars operatively connected to the steerable water discharge nozzle to facilitate steering of the watercraft by the operator, the handlebars extending transversely with respect to the watercraft and having a center and a rotational axis extending through such center. A grab handle is mounted to the handlebars and extends from the handlebars in a direction toward the operator, the grab handle being generally centered on the handlebars' axis of rotation.

19 Claims, 4 Drawing Sheets

PERSONAL WATERCRAFT WITH CHILD'S GRAB HANDLE

TECHNICAL FIELD

The invention relates to a jet-propelled personal watercraft, and, more particularly, to a personal watercraft having a child's grab handle.

BACKGROUND OF THE INVENTION

Jet-propelled personal watercraft have become very popular for recreational boating. Such watercraft are characterized by having a hull containing an internal combustion engine for powering the watercraft, a deck portion providing a passenger area with controls operable by an operator in the passenger area, and a raised, longitudinally extending seat adapted to accommodate one or more riders seated in straddle fashion on the seat. The engine powers a jet propulsion unit mounted in the bottom rear portion of the hull, the jet propulsion unit including a steerable water discharge nozzle. The controls include a set of generally transversely extending handlebars operatively connected to the steerable water discharge nozzle to facilitate steering of the watercraft by the operator.

Personal watercraft are intended to be operated by adults, but sometimes an adult will wish to ride with a child seated in front of him or her. In the past personal watercraft have not provided any additional handles or other structure (besides the normal handlebars, etc.) for such a child to grasp. Some riders have attached flexible straps (such as rope, garden hose, nylon straps, or the like) at convenient locations (such as the handlebars) for such a child to grasp. To date, however, it is believed that manufacturers of personal watercraft have not provided any type of handle specifically designed for use by such a child.

SUMMARY OF THE INVENTION

The invention provides a grab handle for a child riding in front of the operator of a jet-propelled personal watercraft. Such a watercraft is characterized by having a hull defining an engine compartment sized to contain an internal combustion engine for powering the watercraft, the hull including a deck portion providing a passenger area containing controls operable by an operator in the passenger area, the deck portion having a raised, longitudinally extending seat adapted to accommodate at least two riders seated in straddle fashion. A jet propulsion unit is powered by the engine, the jet propulsion unit including a steerable water discharge nozzle. The controls include a set of handlebars operatively connected to the steerable water discharge nozzle to facilitate steering of the watercraft by the operator, the handlebars extending transversely with respect to the watercraft and having a center and a rotational axis extending through such center. A grab handle is mounted to the handlebars and extends from the handlebars in a direction toward the operator, the grab handle being generally centered on the handlebars' axis of rotation.

DETAILED DESCRIPTION OF THE INVENTION

Figure 1:
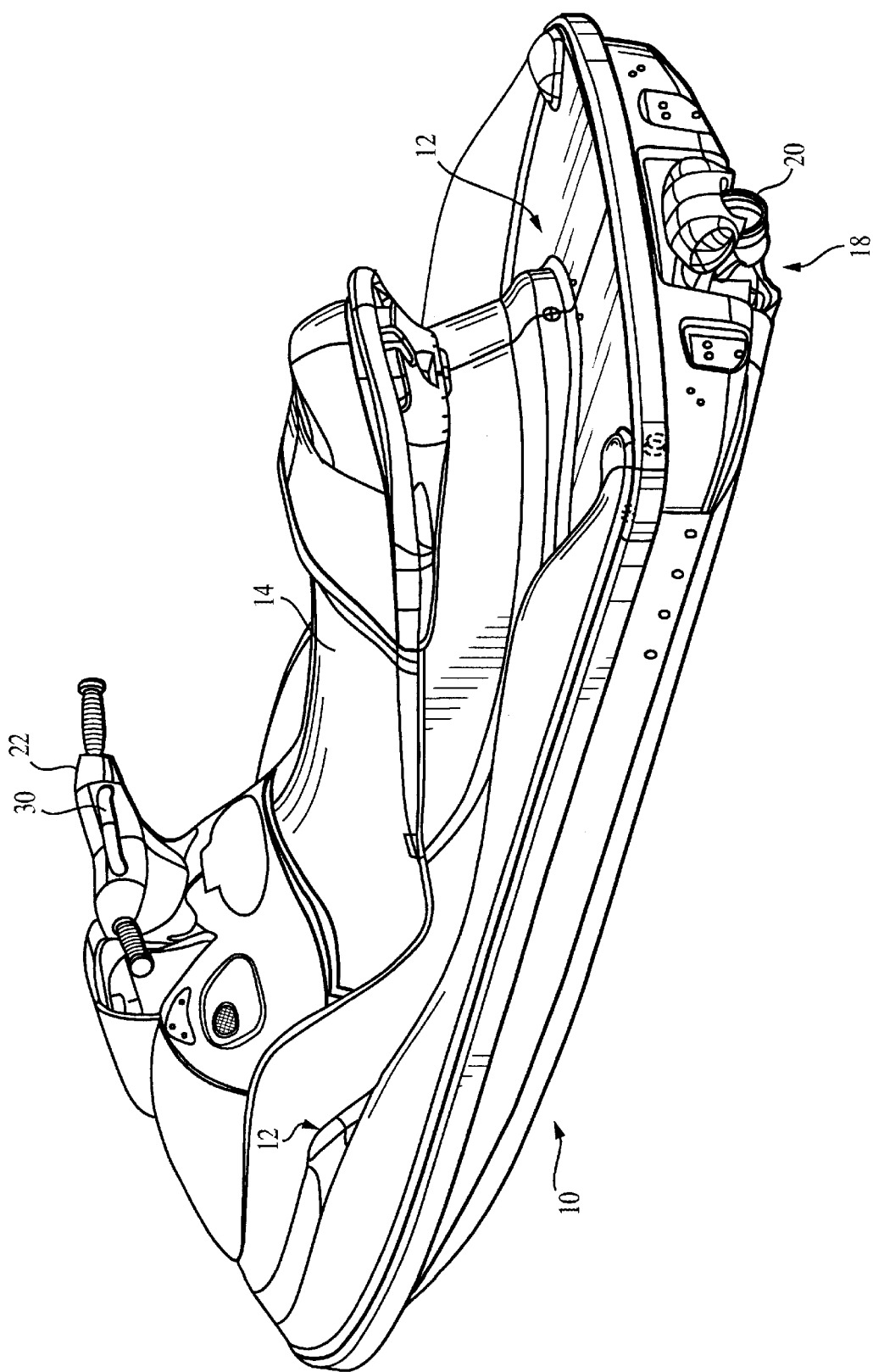
FIG. 1 is a perspective view of a personal watercraft of the invention.
Figure 2:
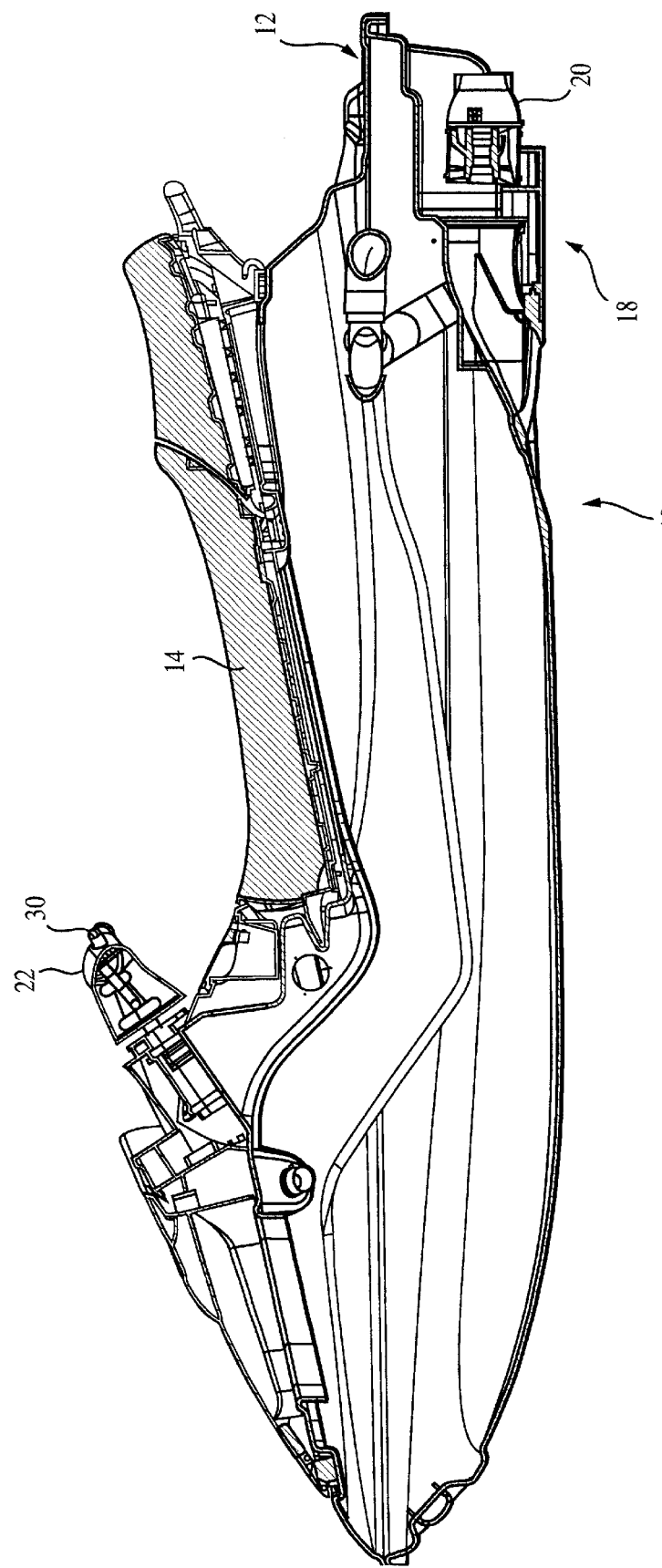
FIG. 2 is a cross-sectional view of the personal watercraft of FIG. 1, taken generally along the centerline of the watercraft.

FIGS. 1–2 depict generally a preferred embodiment of a jet-propelled personal watercraft of the invention. Such a watercraft includes an outer hull designated generally by the reference numeral 10. The hull 10 includes a compartment sized to contain an internal combustion engine for powering the watercraft, and may also include one or more storage compartments, depending upon the size and configuration of the watercraft. The hull 10 includes a deck portion 12 providing a passenger area containing controls operable by an operator in the passenger area. The deck portion 12 also has a raised, longitudinally extending seat 14 adapted to accommodate at least two riders—an adult and a child—seated in straddle fashion on the seat 14. A jet propulsion unit 18, typically mounted at the bottom rear portion of the watercraft, is powered by the engine. The jet propulsion unit 18 includes a steerable water discharge nozzle 20 that is operatively connected to a set of handlebars 22 to facilitate steering of the watercraft by the operator. Such connection may be of any suitable type, and typically includes mechanical linkages including a control cable. If desired, an electronic connection could also be utilized.

Figure 3:
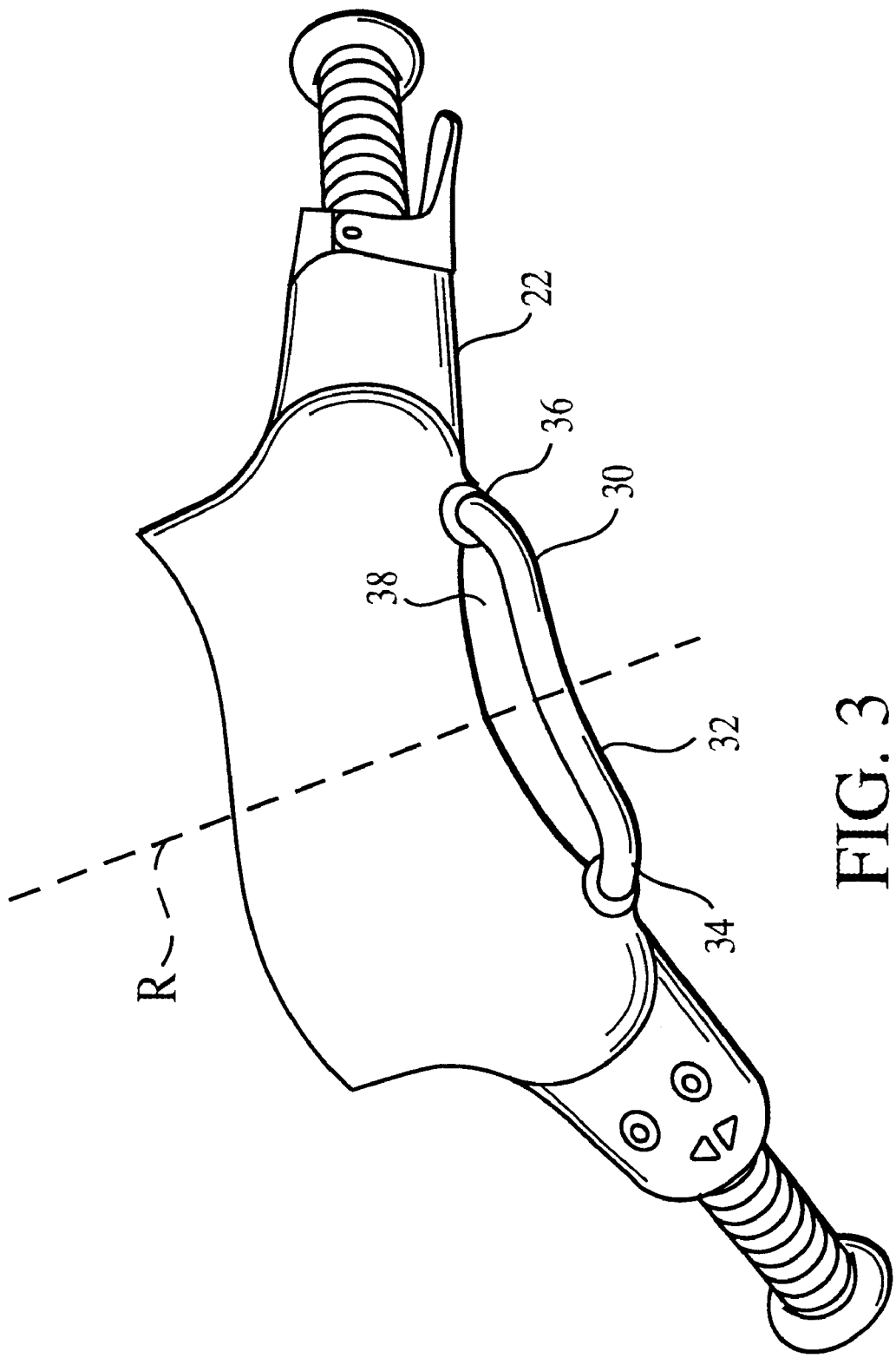
FIG. 3 is a broken-away perspective view of the handlebars of the watercraft of FIG. 1.
Figure 4:
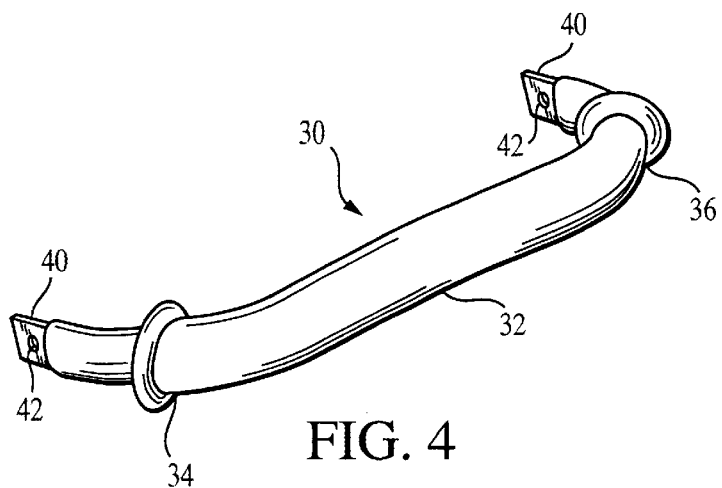
FIG. 4 is a perspective view of the grab handle component of the invention.
Figure 5:
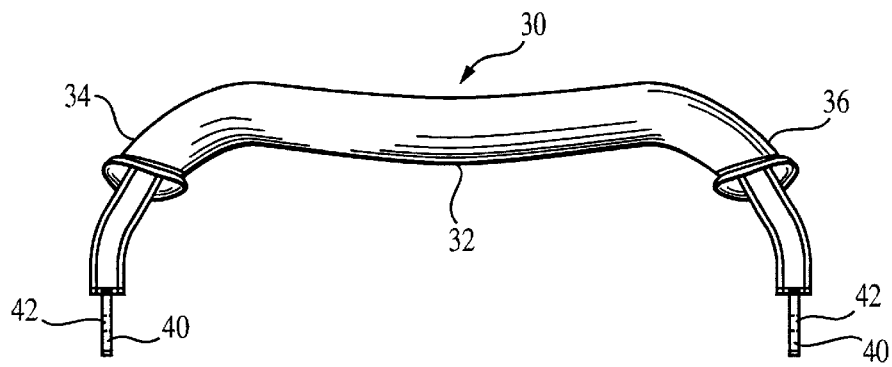
FIG. 5 is a top view of the grab handle shown in FIG. 4.
Figure 6:
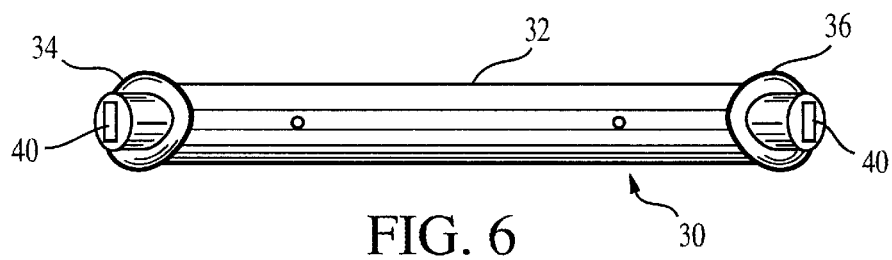
FIG. 6 is a front view of the grab handle of FIG. 4.
Figure 7:
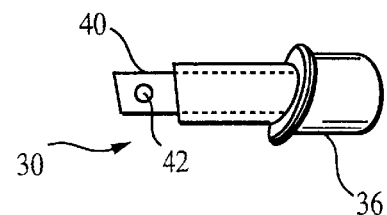
FIG. 7 is a side view of the grab handle of FIG. 4.

FIG. 3 shows further details about the handlebars 22. The handlebars 22 extend generally transversely with respect to the watercraft and have a center and a rotational axis "R" (see FIG. 3) extending through such center.

A grab handle 30 is mounted to the handlebars 22 and extends generally rearwardly from the handlebars 22 in a direction toward the operator, generally parallel to the handlebars' axis of rotation "R". In the preferred embodiment shown in the drawings, the grab handle 30 is angled slightly upwardly (i.e., upwardly from the horizontal) as well—it need not do so, however, and alternately could extend either straight back or be angled somewhat downwardly. The grab handle 30 is generally centered on the handlebars' axis of rotation "R". The grab handle 30, like the handlebars 22, preferably is oriented generally transversely with respect to the watercraft.

The handlebars 22 and the grab handle each have a lateral length. As can be seen in FIG. 3, the lateral length of the grab handle 30 is substantially less than the lateral length of the handlebars 22. Desirably the lateral length of the grab handle 30 is less than half the lateral length of the handlebars 22, and preferably it is less than one third of the lateral length of the handlebars 22. On a typical watercraft this would mean that the lateral length desirably is less than about ten inches. In the preferred embodiment shown in the drawings, the grab handle 22 has a lateral length of about 8.25 inches.

Although various configurations for the grab handle could be utilized, in the preferred embodiment shown in the drawings the grab handle 30 includes a central handle portion 32 and left and right ends 34 and 36 respectively secured to the handlebars 22. The grab handle 22 thereby defines with the handlebars 22 an opening 38 through which a child may extend a hand to grasp the grab handle 30. The lateral length of this opening preferably is not more than eight inches, and, in the preferred embodiment, is about 6.5 inches. To make the grab handle unobtrusive, preferably the central handle portion 32 is spaced a distance of not more than about two inches from the handlebars 22. As can be seen in FIG. 3, the portion of the handlebars 22 immediately across from the central portion 32 of the grab handle 30 is curved forwardly. Accordingly, it is possible to provide a slight forward deflection in the central handle portion 32 of the grab handle 30 while maintaining a large enough gap between the grab handle 32 and the handlebars 22 for a child's hand.

Preferably the grab handle 30 is stiff enough to provide a secure handle for the child, yet somewhat flexible for comfort. FIGS. 4–7 depict a preferred embodiment for balancing these considerations. The grab handle is made from a relatively softer outer cushion covering a relatively stiffer inner core element 40. The cushion covering may be made from any suitable material; rubbers and soft plastics are preferred, such as Santoprene®, a rubber material available from Monsanto Company. Similarly, the inner core element may be made from any suitable material—relatively rigid nylon (which nevertheless has some flexibility) has worked well. Preferably the core element 40 has a substantially constant cross-section along its length. In the drawings, the core element is shown as having a rectangular cross-section (see FIG. 6), but other shapes, such as oval, diamond, etc. may also be utilized.

Desirably the cross-section of the core element 40 has a height at least twice its width, and preferably a height at least three times its width. Preferably the width is not more than a quarter inch (in the preferred embodiment it is about one eighth of an inch). If configured with the width smaller than the height and with the width dimension of the central handle portion 32 being oriented generally parallel to the direction the grab handle 30 extends from the handlebar, the grab handle will be more flexible in such direction than in other directions. That is, referring to FIG. 5, the shape of the core element 40 in this embodiment causes the grab handle 30 to be relatively more flexible in the up and down directions in FIG. 5 than in any other direction.

The ends of the core element 40 preferably extend from the outer cushion, thereby providing a convenient way of securely mounting the grab handle 30 to the handlebars. The end portions of the core element 40 are each provided with a mounting hole 42 through which a conventional fastener may extend in order to secure the grab handle 30 to the handlebars 22.

While a preferred embodiment of the present invention has been described, it should be understood that various changes, adaptations and modifications may be made therein without departing from the spirit of the invention and the scope of the appended claims.

What is claimed is:

1. A jet-propelled personal watercraft comprising:
   a hull defining an engine compartment sized to contain an internal combustion engine for powering the watercraft, the hull including a deck portion providing a passenger area containing controls operable by an operator in the passenger area, the deck portion having a raised, longitudinally extending seat adapted to accommodate in straddle fashion at least the operator and a child seated in front of the operator;
   a jet propulsion unit powered by the engine, the jet propulsion unit including a steerable water discharge nozzle;
   the controls including a set of handlebars operatively connected to the steerable water discharge nozzle to facilitate steering of the watercraft by the operator, the handlebars extending transversely with respect to the watercraft and having a center and a rotational axis extending through such center; and
   a grab handle attached transversely across the handlebars for grasping be the child seated in front of the operator, the grab handle having a relatively softer outer cushion covering a flexible inner core element.

2. The jet-propelled personal watercraft of claim 1 wherein the grab handle is oriented transversely with respect to the watercraft.

3. The jet-propelled personal watercraft of claim 1 wherein the handlebars and the grab handle each has a lateral length, the lateral length of the grab handle being less than one half of the lateral length of the handlebars.

4. The jet-propelled personal watercraft of claim 1 wherein the handlebars and the grab handle each has a lateral length, the lateral length of the grab handle being less than one, third of the lateral length of the handlebars.

5. The jet-propelled personal watercraft of claim 1 wherein the grab handle has a lateral length of less than ten inches.

6. The jet-propelled personal watercraft of claim 1 wherein the grab handle comprises left and right ends respectively secured to the handlebars, the grab handle extending nonlinearly from the left and right ends in a direction toward the operator, the grab handle thereby defining with the handlebars an opening through which a child may extend a hand to grasp the grab handle.

7. The jet-propelled personal watercraft of claim 1 wherein the outer cushion is made from soft plastic and the inner core is made from nylon.

8. The jet-propelled personal watercraft of claim 1 wherein the core element has a substantially constant cross-section along its length.

9. The jet-propelled personal watercraft of claim 8 wherein the cross-section of the core element has a height at least twice its width.

10. The jet-propelled personal watercraft of claim 8 wherein the cross-section of the core element has a height at least three times its width.

11. The jet-propelled personal watercraft of claim 8 wherein the cross-section of the core element has a width of not more than a quarter inch.

12. The jet-propelled personal watercraft of claim 8 wherein the cross-section of the core element has a height and a width, the height being greater than the width, the width of that portion of the core element disposed in the central handle portion of the grab handle being oriented generally parallel to the direction in which the grab handle extends from the handlebar, thus making the grab handle more flexible in such direction than in other directions.

13. The jet-propelled personal watercraft of claim 1 wherein the grab handle is centered on the handlebars' axis of rotation.

14. The jet-propelled personal watercraft of claim 1 wherein the grab handle comprises a central handle portion and left and right ends, the ends secured to the handlebars, the central handle portion having the relatively softer outer cushion entirely covering the flexible inner core element.

15. A jet-propelled personal watercraft comprising:
   a hull defining an engine compartment sized to contain an internal combustion engine for powering the watercraft, the hull including a deck portion providing a passenger area containing controls operable by an operator in the passenger area, the deck portion having a raised, longitudinally extending seat adapted to accommodate at least two riders seated in straddle fashion;

a jet propulsion unit powered by the engine, the jet propulsion unit including a steerable water discharge nozzle;

the controls including a set of handlebars operatively connected to the steerable water discharge nozzle to facilitate steering of the watercraft by the operator, the handlebars extending transversely with respect to the watercraft and having a center and a rotational axis extending through such center; and a grab handle attached to the handlebars, the grab handle being centered on the handlebars' axis of rotation and oriented transversely with respect to the watercraft, the grab handle extending from the handlebars in a direction toward the operator;

the handlebars and the grab handle each having a lateral length, the lateral length of the grab handle being less than one third of the lateral length of the handlebars;

the grab handle comprising a central handle portion and left and right ends respectively secured to the handlebars, the grab handle thereby defining with the handlebars an opening through which a child may extend a hand to grasp the grab handle, the central handle portion being spaced a distance of not more than two inches from the handlebars and the opening being not more than eight inches in transverse length, the central handle portion being deflected slightly forwardly;

the grab handle being comprised of a relatively softer outer cushion covering a relatively stiffer inner core element;

the core element having a substantially constant cross-section along its length, such cross-section having a height at least three times its width, the width being not more than a quarter inch and being oriented generally parallel to the direction the grab handle extends from the handlebar, thus making the grab handle more flexible in such direction than in other directions.

16. A jet-propelled personal watercraft comprising:

a hull defining an engine compartment sized to contain an internal combustion engine for powering the watercraft, the hull including a deck portion providing a passenger area containing controls operable by an operator in the passenger area, the deck portion having a raised, longitudinally extending seat adapted to accommodate at least two riders seated in straddle fashion;

a jet propulsion unit powered by the engine, the jet propulsion unit including a steerable water discharge nozzle;

the controls including a set of handlebars operatively connected to the steerable water discharge nozzle to facilitate steering of the watercraft by the operator, the handlebars extending transversely with respect to the watercraft and having a center and a rotational axis extending through such center; and a grab handle attached to the handlebars and extending from the handlebars in a direction toward the operator, the grab handle being centered on the handlebars' axis of rotation, the grab handle having a central handle portion and left and right ends, the ends each secured to the handlebars, the grab handle thereby defining with the handlebars an opening through which a child may extend a hand to grasp the grab handle, the central handle portion being spaced a distance of not more than two inches from the handlebars.

17. A jet-propelled personal watercraft comprising:

a hull defining an engine compartment sized to contain an internal combustion engine for powering the watercraft, the hull including a deck portion providing a passenger area containing controls operable by an operator in the passenger area, the deck portion having a raised, longitudinally extending seat adapted to accommodate at least two riders seated in straddle fashion;

a jet propulsion unit powered by the engine, the jet propulsion unit including a steerable water discharge nozzle;

the controls including a set of handlebars operatively connected to the steerable water discharge nozzle to facilitate steering of the watercraft by the operator, the handlebars extending transversely with respect to the watercraft and having a center and a rotational axis extending through such center; and a grab handle attached to the handlebars and extending from the handlebars in a direction toward the operator, the grab handle being centered on the handlebars' axis of rotation, the grab handle having a central handle portion and left and right ends, the ends each secured to the handlebars, the grab handle thereby defining with the handlebars an opening through which a child may extend a hand to grasp the grab handle, the opening being not more than eight inches in transverse length.

18. A jet-propelled personal watercraft comprising:

a hull defining an engine compartment sized to contain an internal combustion engine for powering the watercraft, the hull including a deck portion providing a passenger area containing controls operable by an operator in the passenger area, the deck portion having a raised, longitudinally extending seat adapted to accommodate at least two riders seated in straddle fashion;

a jet propulsion unit powered by the engine, the jet propulsion unit including a steerable water discharge nozzle:

the controls including a set of handlebars operatively connected to the steerable water discharge nozzle to facilitate steering of the watercraft by the operator, the handlebars extending transversely with respect to the watercraft and having a center and a rotational axis extending through such center; and a grab handle attached to the handlebars and extending from the handlebars in a direction toward the operator, the grab handle being centered on the handlebars' axis of rotation, the grab handle having a central handle portion and left and right ends, the ends each secured to the handlebars, the grab handle thereby defining with the handlebars an opening through which a child may extend a hand to grasp the grab handle, the central handle portion being deflected slightly forwardly.

19. The jet-propelled personal watercraft of claim 18 wherein the grab handle is comprised of a relatively softer outer cushion covering a relatively stiffer inner core element.

* * * * *